US008731866B2

(12) United States Patent  
Cacace et al.

(10) Patent No.: US 8,731,866 B2  
(45) Date of Patent: May 20, 2014

(54) LOCATION SYSTEM FOR STREET LIGHT MONITORING

(75) Inventors: Vincenzo Cacace, Lecce (IT); Marco Rizzello, Puglia (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 335 days.

(21) Appl. No.: 13/209,352

(22) Filed: Aug. 12, 2011

(65) Prior Publication Data

US 2012/0059622 A1    Mar. 8, 2012

(30) Foreign Application Priority Data

Aug. 13, 2010    (IT) .............................. VI2010A0235

(51) Int. Cl.
*G06F 15/00* (2006.01)
*H05B 37/02* (2006.01)
*H04L 12/24* (2006.01)
*H04W 4/08* (2009.01)

(52) U.S. Cl.
CPC ............ *H05B 37/0272* (2013.01); *H04L 41/12* (2013.01); *H04W 4/08* (2013.01)
USPC .......................................... 702/150; 702/158

(58) Field of Classification Search
CPC ..... H05B 37/0272; H04L 41/12; H04W 4/08; H04W 64/00; H04W 8/186; Y02B 20/72
USPC ......... 702/58, 64, 150, 158, 183; 340/870.11; 370/328; 455/456.1
See application file for complete search history.

(56) References Cited

U.S. PATENT DOCUMENTS

| 8,260,575 B2 * | 9/2012 | Walters et al. ................ 702/183 |
| 8,300,577 B2 * | 10/2012 | Simons et al. ................ 370/328 |
| 8,442,785 B2 * | 5/2013 | Walters et al. ................ 702/58 |

FOREIGN PATENT DOCUMENTS

| EP | 1039689 A2 | 9/2000 |
| WO | 2007102114 A1 | 9/2007 |
| WO | 2008129488 A2 | 10/2008 |

OTHER PUBLICATIONS

Italian Search Report Dated Mar. 24, 2011, for Italian Patent Application No. VI2010A000235 Filed Aug. 13, 2010.

* cited by examiner

*Primary Examiner* — John H Le
(74) *Attorney, Agent, or Firm* — Graybeal Jackson LLP

(57) ABSTRACT

A street light monitoring system has a small fraction of the street lights in the system being anchor nodes that are configured to detect and store their own actual fixed position, thereby acting as reference points. Further, the other street lights are referred to as blind nodes and do not have their actual fixed position but can derive their position using the coordinates of the anchor nodes and estimating their distance to them. The distance estimation for any blind node can be performed using a received signal strength indication (RSSI) measured at the respective blind node for small distances of up to a threshold value and a link quantization technique takes advantage of the typical placement of the street lights. Inferred distances between the street lights can be assigned to pre-determined categories of distances for a coarse estimation and further position adjustment to a closest possible "real" position.

21 Claims, 14 Drawing Sheets

Fig. 6

$$RSSI_{i,j(dBm)} = P_{0(dBm)} - 10n\log_{10}\left(\frac{d_{i,j}}{d_0}\right) \quad \underline{610}$$

$$\hat{d}_{ij} = d_0 \cdot 10^{\frac{P_0 - RSSI_{ij}}{10 \cdot n}} \quad \underline{620}$$

- $RSSI_{ij}$: Received signal strength measured by node "j" when the "i" transmits
- $d_0$: reference distance
- $P_0$: RSSI evaluated at $d_0$
- $d_{ij}$ and $\hat{d}_{ij}$: real and estimated distance between node i and j
- $n$: Path loss exponent

LOCATION SYSTEM FOR STREET LIGHT MONITORING

PRIORITY CLAIM

The present application claims the benefit of Italian Patent Application No. VI2010A000235, filed Aug. 13, 2010, which application is incorporated herein by reference in its entirety.

TECHNICAL FIELD

Generally, embodiments of the present disclosure relate to a street light monitoring system, where a small fraction of the street lights in the street light system are configured to detect and store their own actual fixed position, thereby acting as reference points. Further, the other street lights in the street light system do not have their actual fixed position but can automatically derive their position by exploiting the coordinates of the street lights acting as reference points and estimating their distance to them.

BACKGROUND

Street lights are important assets in a city's infrastructure. They provide safe roads in wide public areas and enhance security in homes, businesses and city centers. However, they are usually rather costly to operate. One of the reasons of the high costs is their energy consumption, which can be up to 40 percent of a cities electricity spending. Furthermore, usually street lights have to be inspected periodically to ensure maximum uptimes for safety and security. This, in addition to the electricity costs, causes significant cost of operation.

While street light manufacturers have enhanced their technology to increase both energy efficiency and operational reliability on a single street light basis, most issues in those terms regarding the overall network of street lights or rather street light systems operated by a city have not yet been addressed in a satisfying manner.

Addressing operation costs of a street light network of a city on a network level means managing the maintenance of the street lights not on the basis of single street lights but on the basis of the reliability of the network as a whole. Similarly, managing of the operation costs and in particular the electricity consumption of the street lights on a network basis means dimming lights, for example a number of street lights, to create a suitable light density in specific zones in accordance with schedules based on traffic volumes, once-off events, specific locations, public holidays and weekends, for quiet periods, and the like.

While applying such schemes can be useful in terms of saving energy in one of the largest energy consuming applications of city management, a tradeoff has to be judged with security embodiments. Therefore, while applying dimming and switching schemes to larger parts of the street light system with the aim of reducing electricity consumption in some parts of that same system, at the same time it may be adequate to use a higher level of light density to increase security as, for example, in dimly lit areas or areas generally known to be part of rather insecure neighborhoods.

The prerequisite for applying such asymmetric schemes of managing a street light maintenance and/or switching and dimming schemes of street lights is a reliable "knowledge" of the position of every street light relative to the geography of the respective city. Even though street lights are always typically fixed, of course, and their position is usually defined at installation time, the number of lamps already in a midsized city is large enough that alternative methods to detect any position of a single street light can be very useful, in particular because any software managing the above features of street light network management would need the positions of any lamp and further characteristics such as individual electricity consumption, light density, and the like on a real time basis, and in a digital format in order to apply and execute appropriate managing rules.

Therefore, there is a need for improved methods and systems for detecting street light position in large systems of street lights, such as systems in inner cities.

SUMMARY

In a first embodiment of the present disclosure, a computer-implemented method for a street light monitoring system provides automated position estimation capabilities for all street lights being present in the street light system, thereby enabling efficient management of street lamps. The method includes the steps of providing each street lamp of a network of numerous street lamps with a node controller and a ballast controller, where the node controllers of the street lamps communicate with each other using wireless devices to build up a mesh network. The method further includes providing a number of cluster controllers, the cluster controllers controlling a subset of the street lamps in the network and being equipped with a transceiver that communicates to the mesh network. The method also includes providing a cluster head, the cluster head controlling the network of street light and being coupled to the number of cluster controllers based on wireless devices.

Further, the method can include the steps of providing a small fraction of the street lamps in the network, less than 30% of the street lamps in the network, as anchor street lamps, which is defined as those lamps configured with their absolute and relative coordinates. The method includes determining the average hop length in any path between two anchor street lamps, considering only minimum path length if more paths are available. For each street lamp in the network not being provided with their absolute and relative coordinates as blind street lamps, the distance of the blind street lamp to the nearest anchor street lamps is determined based on evaluating received signal strength indication (RSSI) between the street lamps in the path to the nearest anchor street lamps, assigning the computed path loss derived from the measured RSSI values to pre-determined distance categories, assigning the distance categories to hop link values, and multiplying the hop link values with the average hop length in the respective path. The method infers for each blind street lamp in the network a coarse position using multi-lateration based on the determined distances to the nearest anchor street lamps for that blind street lamp.

Finally, the method includes the step of adjusting the coarse position by selecting for each blind street lamp coarse position the closest possible real position and if no closest possible real position is present, classifying the blind street lamp as not positioned.

Thus, any blind node distance estimation is performed using received signal strength measured with an incoming message at the respective blind node. Embodiments of the present disclosure in this respect are based on the insight that RSSI is reliable only for small distances of up to a threshold value of typically 5 meters. Based on this insight, link quantization is applied that is based on the fact that lamp posts show typical placements. Thus, inferred distances between lamp posts can be assigned to pre-determined categories of distances. Typically there are three categories: 1) the first of about 1 meter (two lamps on the same lamp post); 2) the second of about 4 to 5 meters (two lamps on either side of a street); and 3) the third of about 20 to 30 meters (typical distance of two street lamps on the same side of a street).

The coarse position estimation resulting from that quantization is further improved by finger printing of street light positions and position adjustment of the interfered blind lamp node position. This is based on the insight that during the design phase of the street lamp system, possible positions for lamp posts are defined in terms of their relative and absolute coordinates. Thus, the coarse estimated street lamp position is updated to the closest possible position of the relative coarse estimation. If there is no closer possible real position, a blind street lamp node classifies itself as not positioned and retries the estimation or sends an error message for a manual position set-up request.

Thus, embodiments of the present disclosure use RSSI as an indicator of distance between radio frequency devices but implement the specific insight that this indication is only reliable for short distances up to a threshold value. The poor reliability of the RSSI raw signal is overcome by implementing link quantization which assigns a position based not only on the raw RSSI value but on the number of hops between the node itself and the anchors where the average hop length is computed based on the translation of RSSI into path loss and from path loss to hop lengths. Thereby, the general architecture to control street lights is enriched with location awareness capability without modifying its structure because the devices which participate to the location awareness are the street lights and their street light controller themselves. Thus, even in "older" system configurations updating the "old" structure to the inventive street light monitoring system would preferably only result in an exchange of old street light devices with new ones, the new ones being equipped with wireless controllers. Further, low cost implementation can be achieved as only a fraction of the street light controllers (preferably 5 to 10%) are configured as anchor nodes, i.e., provided with the absolute and relative coordinates.

Thus, embodiments of the present disclosure provide a combination of techniques, in particular the inferring of position of street lamps, the quantization of links and the finger printing of street light positions such that a simple and low cost solution is provided that allows for remotely and individually managed street lights in a large scale street light system. The quantization thresholds allow adjusting the system to any specific environment like, for example, in cities, industrial zones, public parks, stadiums, and the like.

In a further embodiment of the present disclosure, the method further includes the case where no closest possible real position is present, but includes the steps of retrying the estimation and generating a request for sending an error message for a manual position set-up.

In yet another embodiment, the number of distance categories is three, the first relating to two lamps being positioned on the same lamp post, the second being related to two lamps being positioned opposite each other on either sides of a street, and the third being related to two lamps being positioned as neighbors on the same side of a street.

In a further embodiment of the present disclosure, the first distance category is assigned to a hop link value of 0 hop links, the second distance category is assigned to a hop link value of 0.25 hop links, and the third distance category is assigned to a hop link value of 1 hop links.

In an even further embodiment, the node controller is equipped with a RF-ZigBee device, preferably an IEEE802.15.4/ZigBee radio, the mesh network is a WPAN preferably according to the ZigBee standard, and the same network can be built adopting IEEE 802.15.4.

In an even further embodiment, the cluster controller is equipped with a RF-ZigBee device, linked to either to a Wireless router (e.g., Wi-Fi, GPRS, WiMax) or a wired router (e.g., Power Line Modem).

In yet another embodiment of the disclosure, the small fraction of street lamps is a number of 5-10% of all street lights being present in the system.

In another embodiment of the present disclosure, the object is solved by a computer-readable medium having stored thereon computer-readable instruction that, when run on a computer, are configured for performing the steps of any of the above described methods.

Finally, in a further embodiment of the present disclosure, a computer-implemented street light monitoring system provides automated position estimation capabilities for all street lights being present in the street light system and thereby enabling efficient management of street lamps. The system comprises a network of numerous street lamps, each street lamp equipped with a node controller and a ballast controller, the node controllers of the street lamps communicating to each other using wireless devices to build up a mesh network. A number of cluster controllers each controls a subset of the street lamps in the network and is equipped with a transceiver, the transceiver communicating to the mesh network. A cluster head controls the network of street lights and is coupled to the number of cluster controllers based on an external wireless or wired network.

Furthermore, the system can include anchor street lamps as a small fraction of the street lamps in the network and less than 30% of the street lamps in the network provide their absolute and relative coordinates. The system includes a means for determining the average hop length in any path between two anchor street lamps, and includes blind street lamps as each street lamp in the network not provided with their absolute and relative coordinates.

Moreover, the system can include means for determining the distance of a blind street lamp to the nearest anchor street lamp, based on evaluating received signal strength indication (RSSI) between the street lamps in the path to the nearest anchor street lamps, assigning the computed path loss derived from the measured RSSI values to pre-determined distance categories, assigning the distance categories to hop link values and multiplying the hop link values with the average hop length in the respective path, and means for inferring for each blind street lamp in the network a coarse position using multi-lateration based on the determined distances to the nearest anchor street lamps for that blind street lamp.

Finally, the system can include means for adjusting the coarse position by selecting for each blind street lamp coarse position, the closest possible real position, and if no closest possible real position is present, and then classifying the blind street lamp as not positioned.

BRIEF DESCRIPTION OF THE DRAWINGS

Further preferred embodiments are defined in the dependent claims and will also be described in the following with reference to the accompanied drawings, in which:

FIG. 6 illustrates distance estimation for a street light system node based on Received Signal Strength Indication (RSSI) in accordance with embodiments of the present disclosure.

DETAILED DESCRIPTION

Figure 1:
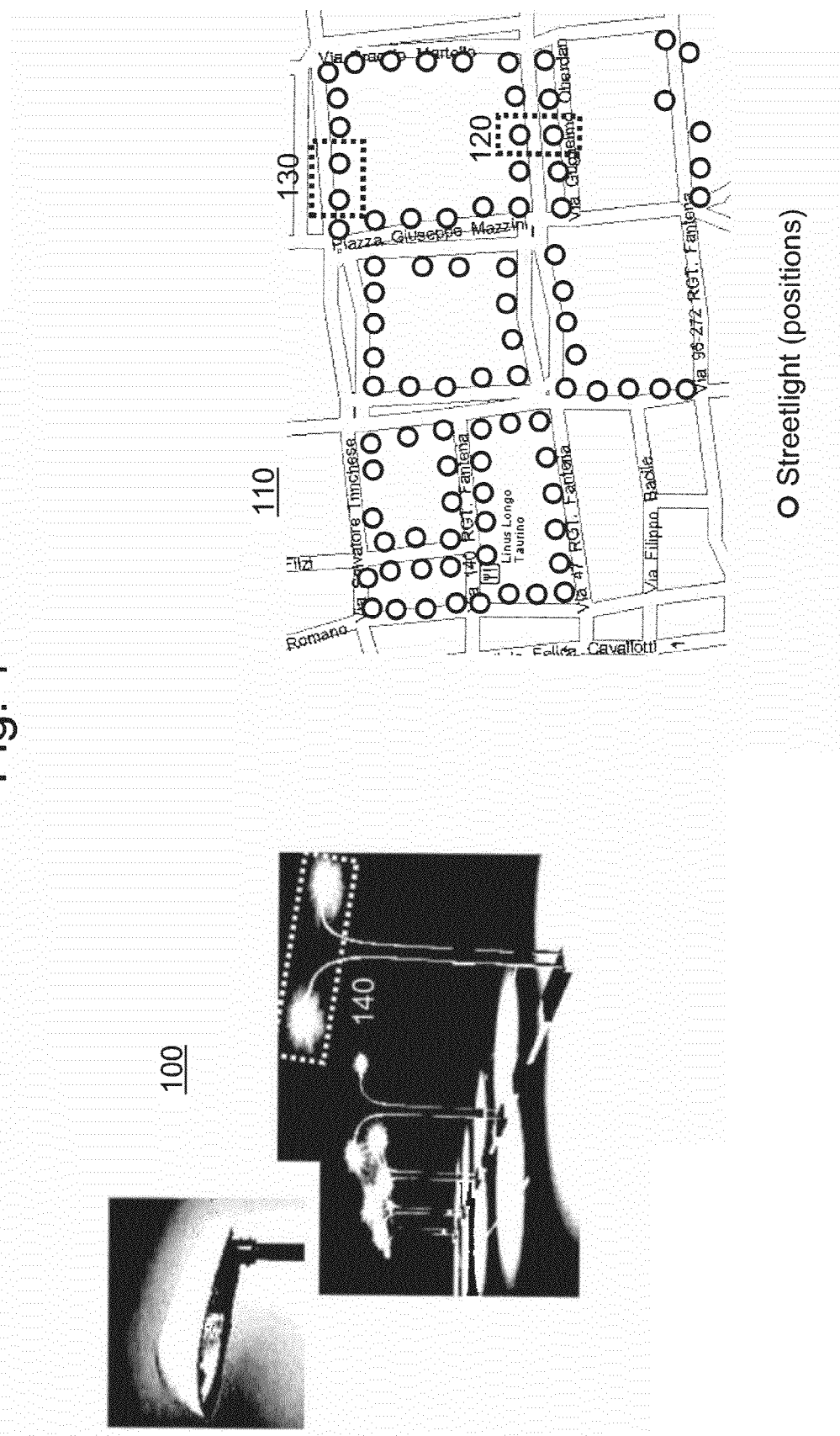
FIG. 1 schematically shows the basic configuration of a street light system.

FIG. 1 shows street lights or street lamps 100 in installation. As can be seen, street light 100 provides light for a well definable area and therefore in order to cover the necessary range, a number of street lights 100 are comprised in the street light system and located relative to one another with a substantially even average distance. This is further illustrated in the overview of the respective street light system 110 which shows the position of the street lights in relation to the respective city's street map.

As illustrated in the exemplary street light system 110, the distances between the street lights 100 in system 110 vary to a certain extent based on the specific local environment and circumstances. However, these distances are overall rather similar and do not substantially deviate from an average distance defined for the overall system 110. Based on the fact, that the positioning of two "neighbor" lamp posts in the street light system 110 will substantially be based on this average distance, typically the distance between any two neighboring street lamps in system 110 can be related to one of three categories of typical distances between single street lamps:

1. A unique lamp post holding two lamps 140 as depicted for the street lamps 100. Here the typical distance is about 1 meter, indicated in the exemplary configuration of street lamp post with two street lamps held on the same street light 100 providing light from the medial strip to either lanes of the street.
2. Street lamps 100 that are positioned at the same spot on either side of a street in an opposite to one another configuration 120. Such configurations 120 are highlighted in the overview of street light system 110. Here, street lamps 100 are illustrated which are positioned opposite to each other providing light for the one and the other lane of the street such that they are positioned with a distance of about 5 meters (depending on street width) from one another.
3. The distance between two lamp posts positioned on the same side of the street configuration 130. Here, the distance is roughly between 20 to 30 meters depending on the specific purposes, neighborhood, and the lighting technology implemented. Such configurations 130 are also shown in the street light system overview 110.

Therefore, for a street light system 110 it can be assumed that almost all lamps 100 or rather any two pairs of lamp posts in a street light system 110 can be assigned to one of the three distance categories above. Even if in a particular installation the distance of the categories may vary depending on the technology implemented (e.g., incandescent or light emitting diode (LED) lamps) or the purpose to be achieved (e.g., light for inner city, traffic lanes, industry arks, and so on), still such three typical categories of distances can be identified. Furthermore, the circumstances and characteristics of a particular implementation, i.e., the precise distance typical for the particular street light system 110 according to the three categories will be known at least at design and/or installation time.

Of course, street lights 100 usually are fixed and do seldom change their position. Thus, most of the positions of street lights 100 in the system 110 will have been defined at design/installation time. Such configurations usually will be documented at design/installation time resulting in a map like the representation of the street light system 110 depicted FIG. 1.

However, assuming that the number of street lamps 100 in a typical street light system 110 is very large, a method would be appreciated that digitally estimates the position of each street light 100 such that the identification of any single street light's location is detectable. Such location identification would enable management applications to detect failures in single street lamps 100, their impact on the overall light situation in system 110 and thereby provides means for prioritizing maintenance activities. Further, such individual street lamp 100 positioning would enable evaluating the light density in specific zones, would allow to switch and/or dim the specific lamps based on their individual position to deploy energy efficiency politics based on schedules and/or events, public holiday and/or weekends, quiet periods, traffic accidents, emergency situations and/or once-off events.

Figure 2:
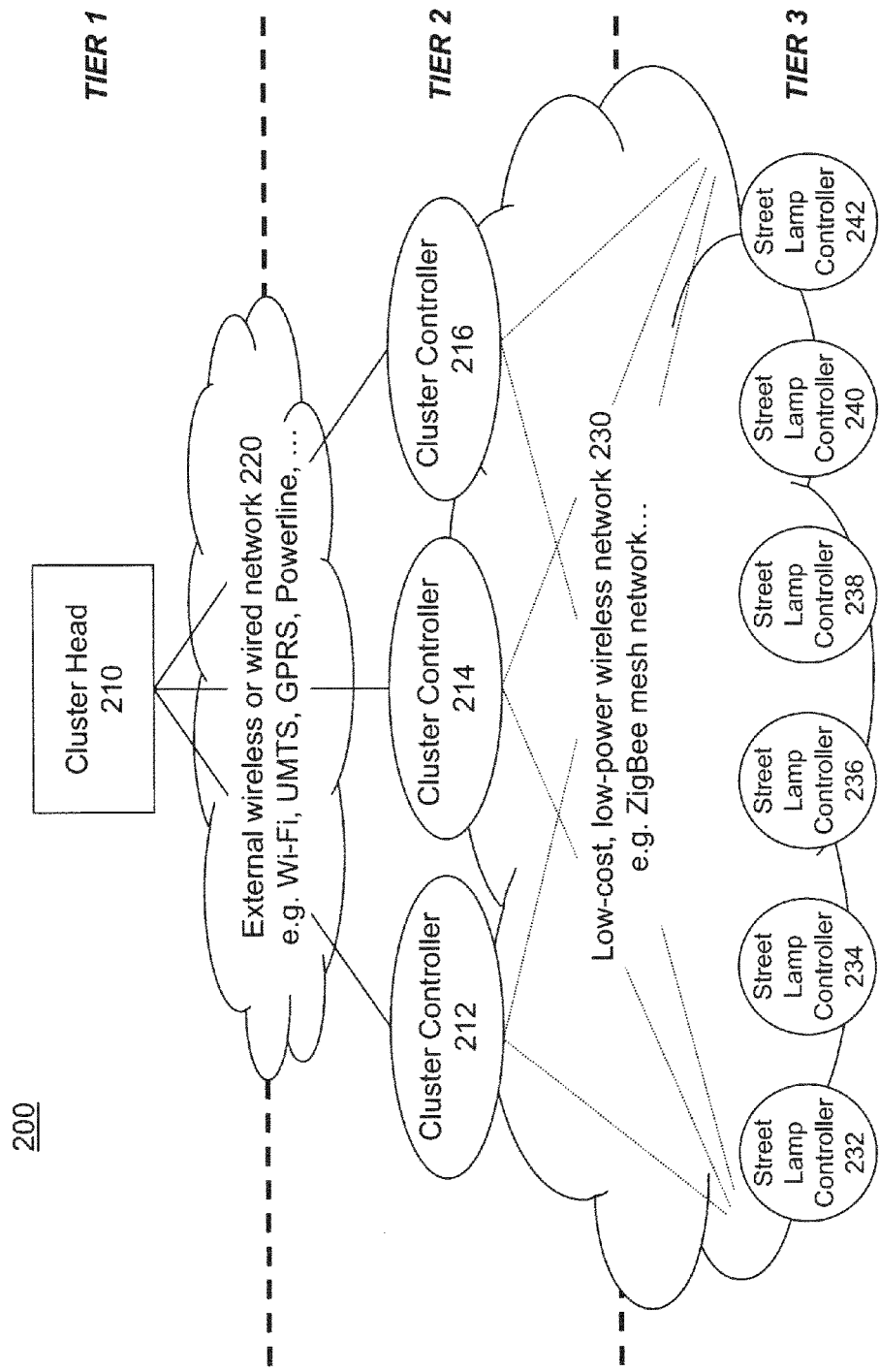
FIG. 2 illustrates the 3-tier-architecture of the street light monitoring system in accordance with embodiments of the present disclosure, FIG. 3 schematically shows the integration of the 3-tier-architecture in a real life street light system scenario in accordance with embodiments of the present disclosure.

An exemplary system and method in accordance with an embodiment of the present disclosure are depicted in FIG. 2. FIG. 2 schematically shows the architecture of a street lamp monitoring system 200. In particular, FIG. 2 shows the S-tier-architecture of the street light monitoring system 200 according to an embodiment of the present disclosure. The embodiment presented in FIG. 2 is specifically designed to allow for efficient street light 100 monitoring. However, the elements of the present disclosure may also be implemented using an alternative architecture, in particular using more or fewer architecture layers than those contained in FIG. 2. Particularly, the location awareness implemented by techniques of embodiments of the present disclosure does not necessarily rely on the three tier architecture as depicted in FIG. 2. Thus, the illustration of FIG. 2 rather serves as an illustrative example.

On the first tier of the street light monitoring system 200, a cluster head 210 is present, which is the central controller of all nodes 212-242 present in the network 200. The cluster head 210 controls the cluster of network nodes 212 to 242 and interacts with the node 212 to 216, which are cluster controllers, via an external wireless or wired network 220. The number of network nodes, cluster controllers, and the examples for wireless network protocols depicted in FIG. 2 are however only of exemplary character. In particular, the number of nodes, the number of cluster controllers and/or means used to implement wireless network connection amongst these nodes may vary in different embodiments of the street light monitoring system 200. The embodiment of the street light monitoring system at 200 depicted in FIG. 2 shows an external network connection 220 between the cluster head 210 and cluster controllers 212 to 216. This wireless network connection 220 is preferably realized using (standard) wireless network technology as for example Wi-Fi, UMTS and/or GPRS. However, also alternatively and in particular other wireless network protocols and/or wired technologies could be used according to embodiments of the present disclosure.

The cluster controllers 212 to 216 act as aggregators which control subsets of street light nodes 232 to 242 installed in a city, where the nodes 232 to 242 are street lamps, each of which includes a street lamp controller and which are accordingly depicted as street lamp controllers in FIG. 2, as will be described in more detail below. The nodes 232 to 242 are referred to as street lamp controllers in the following description. Thus, the cluster controllers 212 to 216 typically control a particular neighborhood that is equipped with a subset of the street lamp controllers 232 to 242. In a preferred embodiment, cluster controllers 212 to 216 are equipped with a radio frequency (RF) ZigBee transceiver linked to a GPRS or PowerLine modem. Such an installation allows building up a low cost, low power wireless network 230, which may also be referred to as a "mesh network" herein, with the cluster controllers 212-216 communicating according to a mesh network scheme with street lamp controllers 232 to 242.

Preferably, cluster controllers 212 to 216 form the second tier of the architecture 200 and interact with the third tier of the architecture 200, the third tier being formed by street lamp controllers 232 to 242, by way of a wireless personal area network (WPAN). In a preferred embodiment for implementing that interaction the low power wireless network 230 utilizes high level communication protocols based on building small and low power digital radio components into a street light monitoring system 200. Preferably for realizing low cost for the low power wireless network 230 the technology according to the ZigBee specification is used that allows simple and less expensive WPANs than with respect to Wi-Fi networks. Thus, a preferred embodiment uses a radio frequency application that requires a low data rate, thus allowing long battery life but still ensuring secure networking. Thus, embodiments of the present disclosure preferably rely on a mesh networking technology providing for robust communication capabilities provided at a low rate of cost and/or energy consumption. This low cost implementation allows for a wide deployments of the wireless control monitoring application and secondly allows for a low power usage which enables long life of batteries (if used) and does not add significantly to the overall power consumption of the street light network 200 energy consumption. Furthermore, the wireless network technology implemented allows for mesh networking with high reliability and extensive range. A further advantage of such a mesh network implementation for the network 230 is that the implemented devices only consume power when activated and go back into a low power sleep mode when not activated.

Preferably using ZigBee RF technology, the implemented system takes advantage of the very short activation time (milliseconds) and as such provides a mesh network 230 with very low latency and responsive devices 232-242 although the components of the system 200 building the mesh network are in the large part in the low power sleep mode most of the time, thus consuming very low or almost no energy.

On the third tier, street lamp controllers 232 to 242 are depicted in FIG. 2. These controllers 232 to 242 control the behavior of a single street lamp, for example in terms of switching it on or off, dimming the light intensity, reporting the status of the street lamp and/or reporting failures of the street lamps. Preferably any street lamp controller 232 to 242 will have installed electronic ballast as one of its subsystems to directly control the lamp power. Therefore, the ballast controller as a subsystem of any street lamp controller 232 to 242 is the control unit, operates to manage the ballast status of the respective street lamp 232 to 242 and reports status and/or failures. In addition, any street lamp controller 232 to 242 preferably is equipped with a node controller which, in a preferred embodiment, is implemented as an RF-ZigBee system on chip (SoC) device linked to the ballast controller of the street lamp controller 232 to 242. The node controller according to the 3-tier-architecture of street light monitoring system 200 is entrusted with the role of acting in the network of street lamp controllers 232 to 242 such that the node controller keeps the connection with the other street lamps 232 to 242 in the network through their respective node controllers.

Thus, the street light management system 200 in a preferred embodiment is designed with a three-tier hierarchical architecture that leads to three different types of dedicated devices. Such devices can be classified in a preferred embodiment as a cluster head 210 being the central controller of all nodes, cluster controllers 212 to 216 (tier 2) acting as aggregators controlling a subset of street lamp nodes, and street lamp controllers 232 to 242 (tier 3) being single lamp systems and being equipped with at least a ballast controller and a node controller, the latter keeping the connection and building the mesh network 230 with the other lamps in the network system 200.

Figure 3:
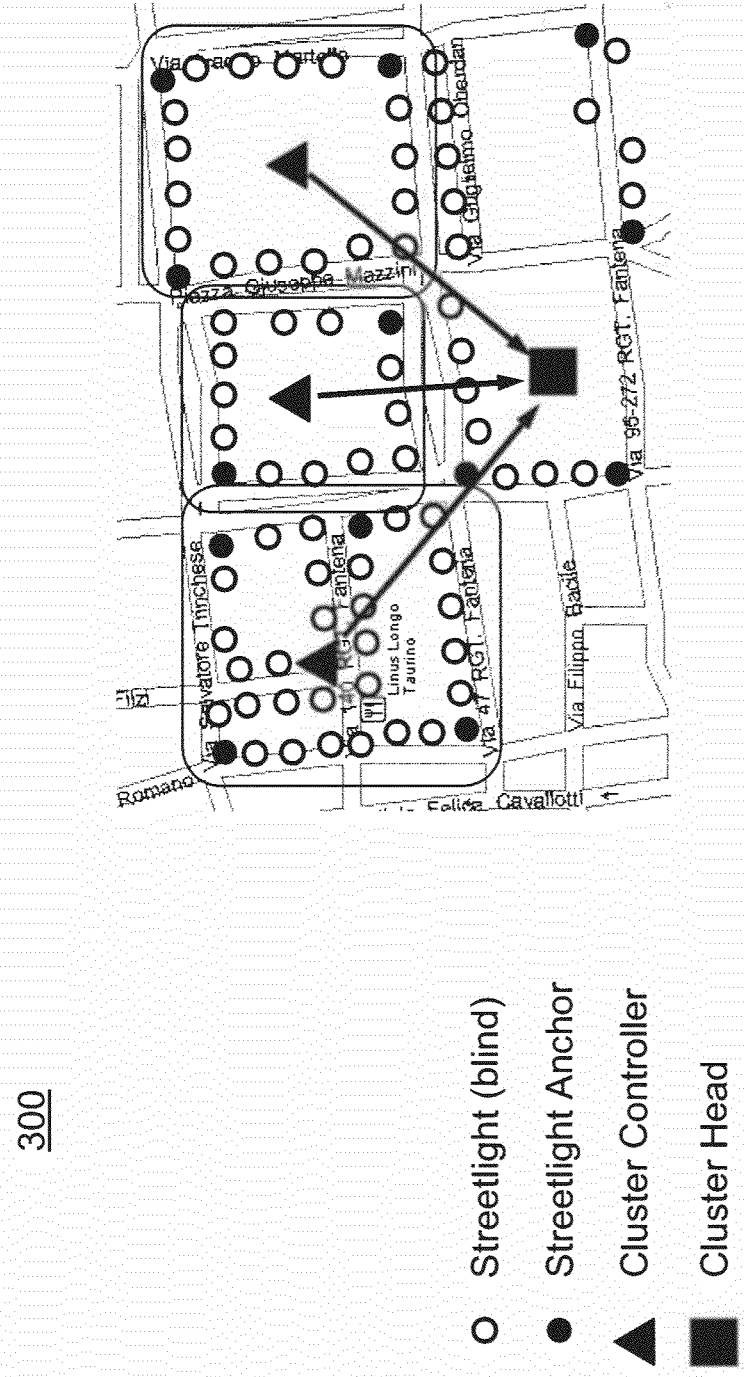

FIG. 3 further shows an exemplary implementation of a street light management system 300 in a real life situation as has been illustrated in FIG. 1, in particular street light system 110. FIG. 3 shows the street light system 300 that implements the 3-tier-architecture of the street light management system according to a preferred embodiment of the present disclosure in the real life situation of a city. As depicted in FIG. 3, all street lights of the system are centrally controlled by the cluster head. On the second tier of the system, three cluster controllers control a subset of all street lights, in particular the street lights of the particular neighborhood. Furthermore, FIG. 3 illustrates two types of street lamps in the street light management system 300, in particular "blind" street lights and "anchor" street lights. As can be seen according to FIG. 3, in a typical installation of street light management system 300, it is sufficient to have 5 to 10% of street lights acting as a street light anchors with 90 to 95% of the street lights acting as blind street lights.

The difference between the blind street lights and the anchor street lights is that the anchor street lights are configured to act as reference nodes in the mesh network 230 (FIG. 2) constituted by the street lights of street light management system 300. The anchor nodes are in contrast to the blind nodes provided with their absolute and relative coordinates. Thus, the anchor nodes are provided with the relative and absolute location. The location of the blind street lights is not provided as such, but can be inferred according to embodiments of the present disclosure by an algorithm that is further described below.

Therefore, the general architecture of controlling street lights is enriched according to embodiments of the present disclosure with a location awareness capability that does not need to modify the structure of the installed base of street lights (e.g., with specific equipment like GPS modules) because the devices that compute the location estimation are the street lights themselves and only a small fraction of them are, typically 5 to 10%, have to be configured as anchor nodes with the absolute and relative coordinates provided and assigned to that particular lamp.

Figure 4:
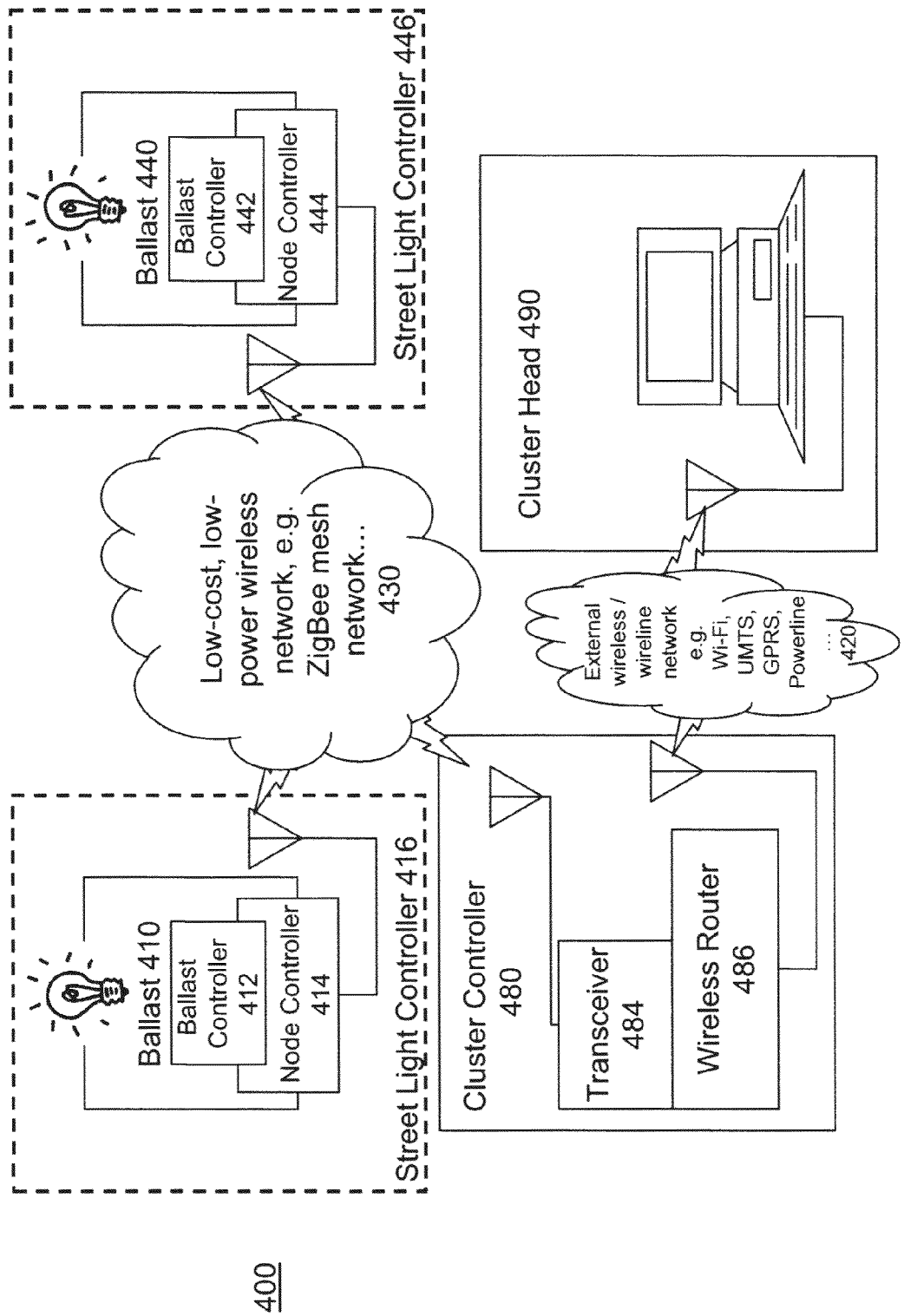
FIG. 4 illustrates the implementation of devices forming the 3-tier-architecture in accordance with embodiments of the present disclosure.

FIG. 4 shows schematically the detailed configuration of the three categories of devices present in the 3-tier-architecture of street light management system 300. In particular, FIG. 4 shows two exemplary street lights, in particular street light controller 416 and 446. Further, one cluster controller 480 of streetlight system 400 is shown and the cluster head of 490 of that street light management system 400, which is an exemplary part of the implementation of the street light management system according to a preferred embodiment of the present disclosure as outlined in FIG. 3. In particular, each street lamp controller 232 to 242 of FIG. 3 is contained in an individual street light and is equipped with a street light controller 416/446 as shown in FIG. 4. Each street light controller 416/446 includes in the embodiment of FIG. 4 at least a ballast 410/440 which in combination with the ballast controller 412/442 allows for controlling the street light's behavior in terms of switching it on or off, dimming of the light intensity, detecting and reporting the status, as well as detecting and reporting eventual failures of the street lamp. Note where the actual lamps in each street lamp are not fluorescent lights, such as when the lights are light emitting diodes (LEDs), the street light controllers 416/446 would not include ballast circuitry but other suitable control circuitry for performing desired operations like switching on and off and dimming of the LEDs, as will be appreciated by those skilled in the art.

Further, as shown in FIG. 4 preferably the ballast controller 412 is coupled with the node controller 414 such that a two-way communication is implemented from the ballast controller 412 over the node controller 414 into the network of street lamps and/or from the network over node controller 414 into ballast controller 412 such that, for example, centrally managed commands can be executed at each street light controller 416/446. For implementing the low cost, low power wireless network 230 built from various street lamps 416/446, each node controller 414 is coupled with a wireless network antenna and thereby implements a wireless network connection that together with the node controllers 414/444 and the respective wireless antennas build a mesh network 430. To that same mesh network 430 is coupled the transceiver 484 of cluster controller 480. Thus, cluster controller 480 via transceiver 484, in a preferred embodiment an RF ZigBee transceiver, controls a subset of all street lamps 416/446 of street light management system 400. Further, cluster controller 480 and the transceiver 484 are coupled to a wireless router 486 that builds a second external network 420 with cluster head 490. For that purpose, router 486 is coupled to a second network in cluster controller 480. Thus, while transceiver 484 is coupled to the first wireless network antenna in cluster controller 480 such that this first wireless network antenna is coupled with transceiver 484 to the low cost, low power wireless mesh network 430 of the various street lights containing controller 416 to 446, the second network is coupled with router 486 and directed to build up an external network with cluster head 490 which may be built even over large distances and thus uses in a preferred embodiment alternative and more expensive network implementation technologies like, for example, Power Line, Wi-Fi, UMTS and/or GPRS communications protocols, each of which will be understood by those skilled in the art. The second external network 420 therefore uses powerful network devices which however are only present in a few elements of the overall street light management system 400, namely the few cluster controllers (one for each neighborhood) and the single cluster head 490.

To provide the system 400 depicted in FIG. 4 with automatic position estimation capabilities that are necessary to implement an efficient management of street lights, each blind node of street light management system 400 has to be able to estimate its own position relative to the anchor nodes of the system since only the anchor nodes are provided with their relative and absolute coordinates in a preferred embodiment, for example by exploiting a GPS device being part of the street light controller 416/446 of particular anchor nodes of the system 400.

Figure 5:
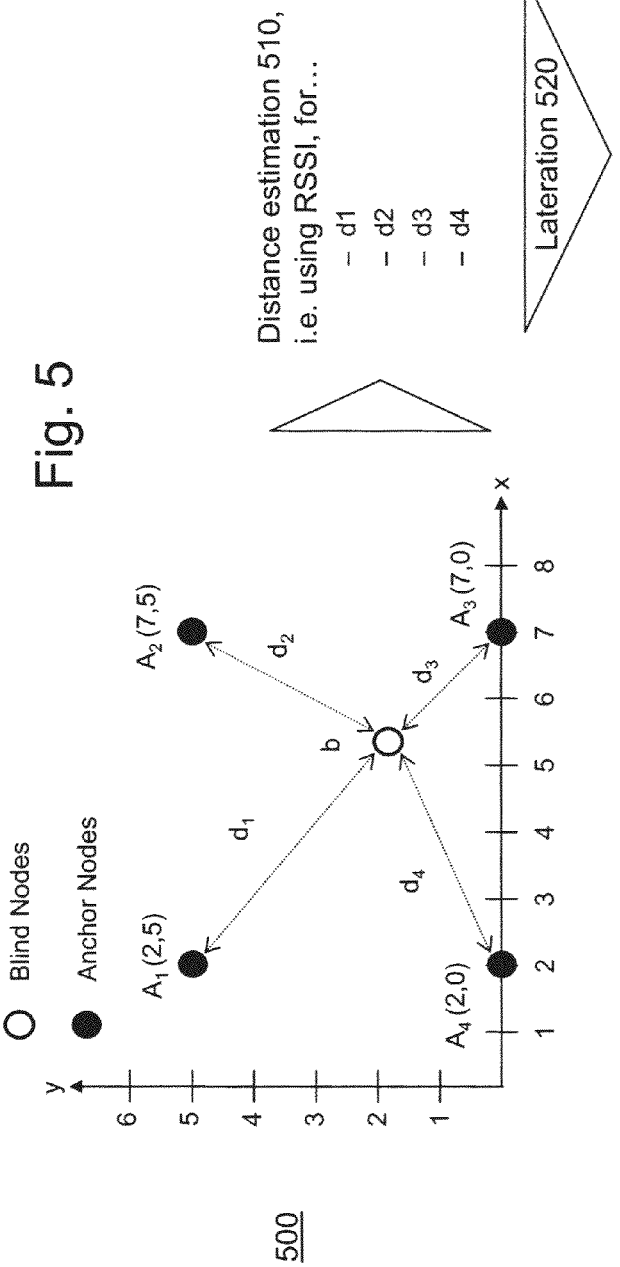
FIG. 5 illustrates the principles of position estimation according to Lateration based on Euclidean distances.

FIG. 5 shows the computation of such distance estimation 510 for a blind node B relative to anchor nodes A1 to A4. This computation 510 uses as an input received signal strength indication (RSSI) to estimate the four distances d1 to d4, each being the estimated distance of blind node b to one of the anchor nodes A1 to A4. The distance estimation based on the path loss, according to a preferred embodiment of the present disclosure, is based on the measurement of the signal power being present in a received radio signal. Thus, generic radio receiver technology is used which is part of the wireless networking protocol family implemented with the wireless mesh network 430. Although there is no specified relationship of any particular physical parameter to the RSSI reading based on specific controller devices 414/444 (FIG. 4) implemented with the mesh network 430, reference measurements can be made such that the distance of street light controller node 416 receiving a radio signal from street light control node 446 to that street light controller node 446, i.e., the source node of the signal can be estimated by measuring the power present in the received radio signal at the receiving street light controller node 416. Based on that path loss distance estimation, lateration 520 can be used to estimate the coordinates of blind node b based on a) the known anchor nodes coordinates and b) the path loss based estimation of distances d1 to d4 of blind node b to each of the anchor nodes that can be computed adopting an appropriate wireless channel model based on Friis transmission equation or its modifications. Assuming, the coordinates of anchor nodes A1 to A4 are known, assuming that the distances d1 to d4 can be estimated based on RSSI measurements with a sufficient accuracy, then computations 530 and 540, respectively can be used to estimate the coordinates of the blind node B.

However, as it would be desirable for a large scale system to have street light controllers 416/446 with a low cost characteristic, accordingly in preferred embodiments a low cost, low power wireless network, e.g., a ZigBee mesh network 430, is implemented that typically has a low initial signal strength and therefore the signal strength over a longer distance will dramatically decrease.

FIG. 6 shows the computation of the loss of signal strength over the distance of sender to receiver in the low power network configuration 430 of a preferred embodiment of the present disclosure. In particular, computation 610 shows the loss of signal strength in relation to the distance $d_{i,j}$ between nodes i and j. Resulting from that computation is the inverse computation 620 showing the estimated distance $d_{i,j}$ between nodes i and j which is computed based on a reference distance $d_0$ (usually 1 meter) multiplied with a factor that is strongly influenced by the path loss exponent which measures the rate at which the received signal strength decreases with distance.

Of course, the path loss exponent depends on the specific propagation environment, i.e., the particular real life environment of street light management system 300. Thus, in a preferred embodiment reference measurements are made at installation time to derive such path loss factors.

Figure 7:
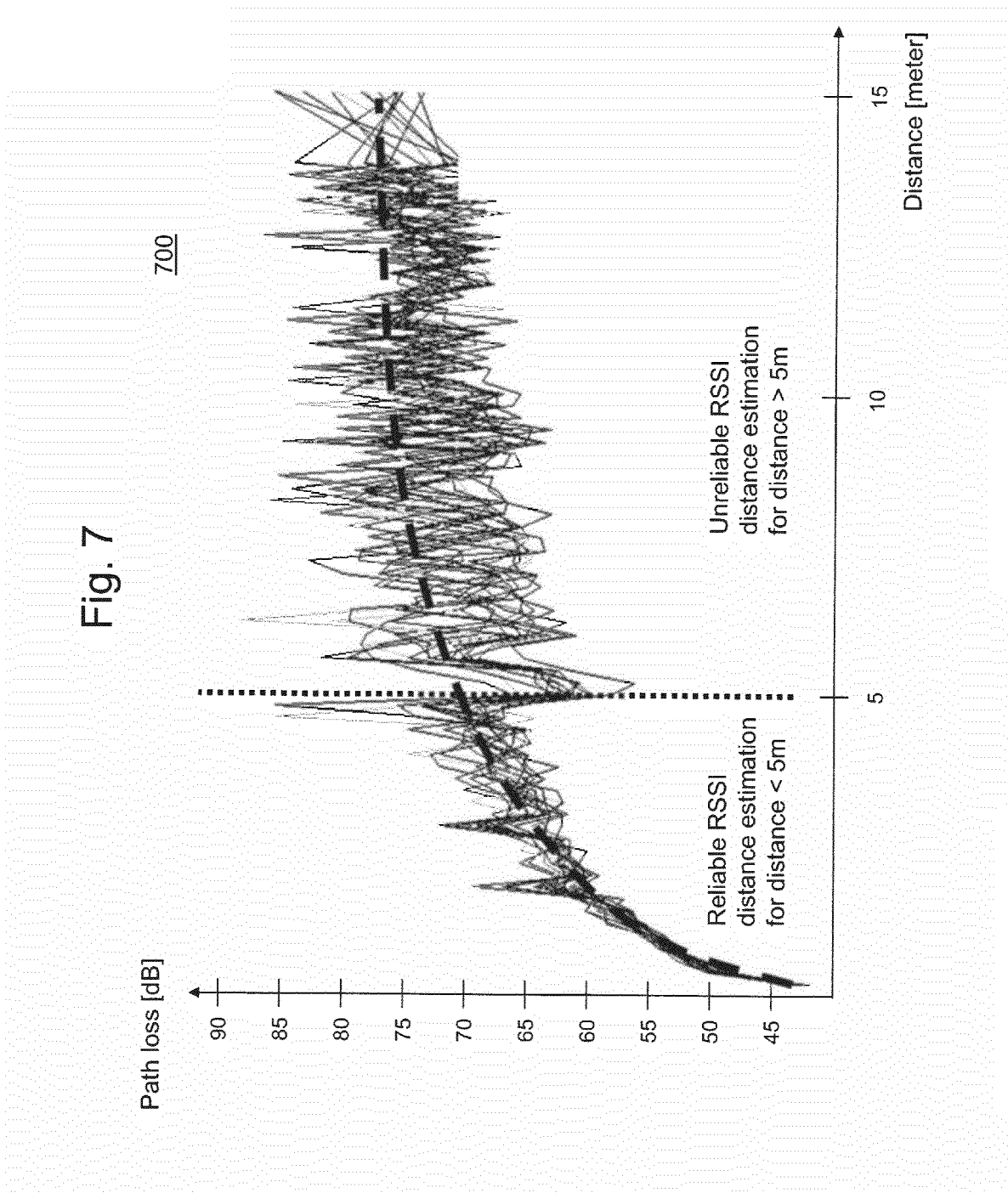
FIG. 7 shows sample data for path loss along the distance from an anchor node to a blind node in accordance with embodiments of the present disclosure.

FIG. 7 shows measurements of path loss over the distance between a sender and receiver node in a low cost wireless network 430. In particular, measurements depicted in FIG. 7 have been made in a typical environment based on ZigBee SN250 ST modules, which in a preferred embodiment of the street light management system 300/400 are used to implement node controller 414/444. The measurement has been made at distances from 0.2 to 15 meters and the data depicted considers the average signal strength measured on each ZigBee channel from 11 (2405 MHz) to 26 (2480 MHz) represented in the graph by different lines. As can be seen from the measurements of the respective modules, a reliable path loss distance estimation in the low power network 430 can only be made as long as sender and receiver node are not further away from each other than 5 meters. Where the distance between sender and receiver nodes exceeds 5 meters, the distance estimation based just on RSSI measurements is rather unreliable and cannot be made with sufficient accuracy to allow for implementing the management schemes necessary for street the light management system 300. The RSSI path loss threshold of 5 meters in this exemplary configuration however may vary with the networks components being implemented and the particular environment found in real life scenarios. Therefore, in a preferred embodiment such threshold values may vary and be specifically derived based on reference measurements taking in to account the specific network modules implemented to build the mesh network and the real life environment that they act in.

Thus, in a preferred embodiment for larger distances between blind street lamp nodes b and anchor street lamp nodes A alternative procedures are implemented in addition to the RSSI distance estimation. For that purpose, the mesh architecture of wireless network 430 can be used as the mesh architecture is built of peer radio devices 414/444 that sustain signal strength by breaking long distances into a series of shorter hops. Therefore, in a preferred embodiment, the mesh network 430 provides a decentralized infrastructure as each node needs only to transmit data and operations as far as the next node. Nodes in network 430 thus act as routers to transmit data from nearby nodes to peers that are too far away to reach in a single hop. Based on that, a network is created that can span larger distances.

Figure 8:
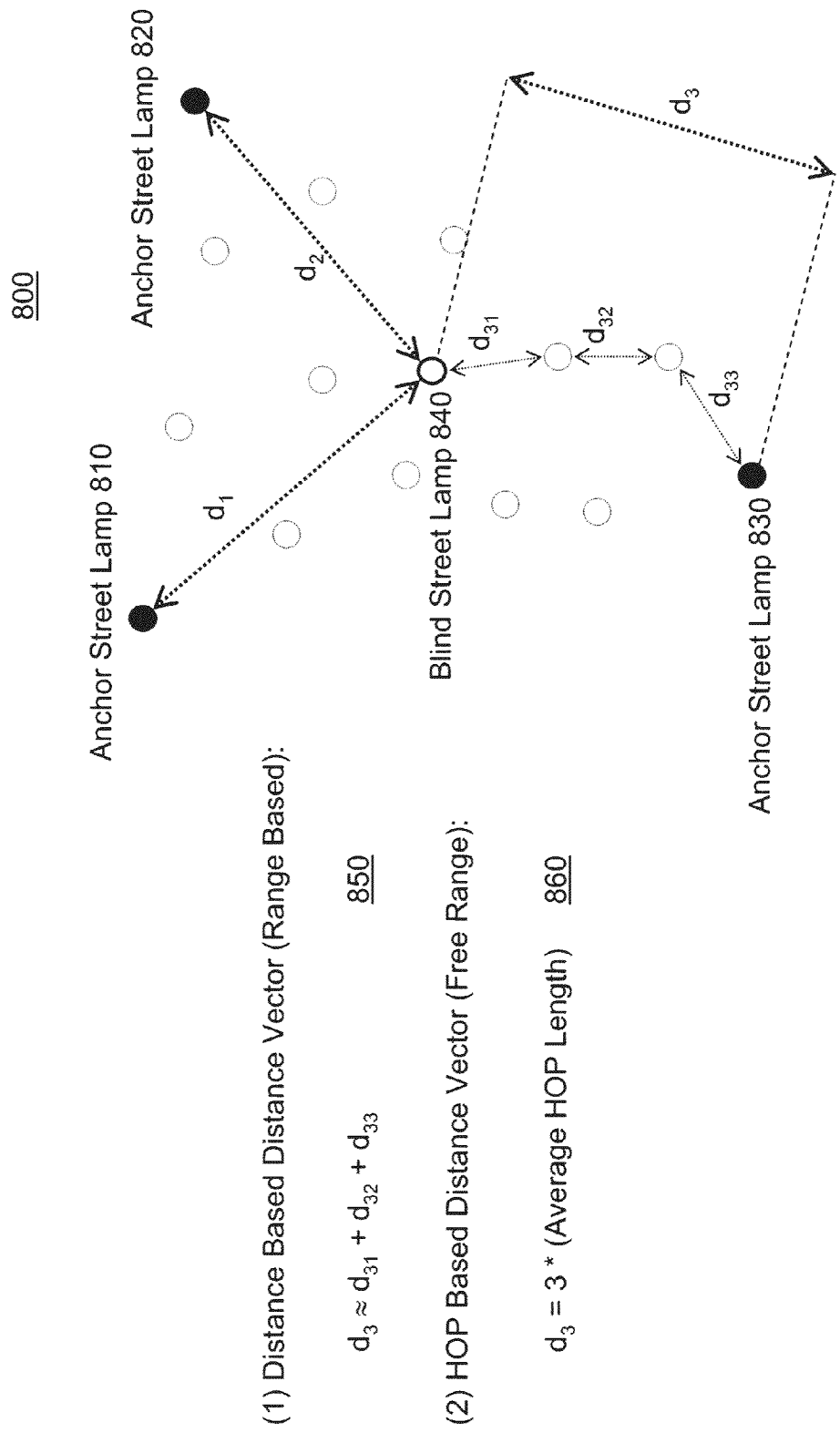
FIG. 8 illustrates distance estimation for a blind node using a multi-hop ranging in accordance with embodiments of the present disclosure.

This architecture characteristic of mesh network 430 can also be used for the distance estimation of blind street lamps. For that, multi-hop ranging is used. A typical form of multi-hop ranging is depicted in FIG. 8. The street light system configuration 800 is similar to the street light system configuration 500 shown in FIG. 5. However, in configuration 800 blind street lamp 840 is too far away (e.g., is out of its RF radio-range) from anchor street lamp 830 in order to measure distance d3 with sufficient accurateness by using RSSI values from street lamp 830. That means that although the distances to anchor street lamp 810 and 820 may be measured with sufficient accuracy, blind street lamp 840 cannot measure the distance to street lamp 830 just based on RSSI, assuming the distance would be far larger than the 5 meters threshold discussed within the context of FIG. 7 or even larger than RF radio range.

In such cases, where at least one of the distance d1 to d3 is a lot larger than the threshold value or even larger than RF radio range, the distance estimation for a blind street lamp node from an anchor street lamp node may be estimated using a multi-hop ranging. One way to compute such multi-hop distance estimations is shown with computation 850. In particular, distance d3 according to computation 850 is computed based on the addition of single hop estimated distances d31, d32 and d33. Alternatively, computation 860 can be used that uses a hop based distance vector. Here, d3 is calculated based on the number of hops between street lamp 840 and anchor street lamp 830 and an average distance value in terms of the average hop length. The number of hops between light street lamp 840 and anchor street lamp 830 is multiplied with a pre-determined average hop length of the network.

However as indicated in configuration 800 shown in FIG. 8, such estimation according to multi-hop ranging can result in a distance estimation for blind node 840 which is very different from the real distances, resulting in such a position estimation process being possibly very inaccurate.

However the distance between street lamps in a typical installation is not random or fortuitous. As outlined further above, in a typical street light system 300 three categories of distances are present and can be distinguished. In a typical example the three categories can be 1 meter for unique lamp post with two lamps (i.e., the two lamps on the unique lamp post are just 1 meter away from each other), 4 to 5 meters for two lamp posts which are placed on either, i.e., opposite sides of a street, and 20 to 30 meters as a typical distance between two neighboring lamp posts on the same side of a street. Thus, the street light monitoring system 200 according to embodiments of the present disclosure takes advantage of this insight in terms of these categories of distances between lamp posts in street light system 200 and uses a respective link quantization procedure.

Of course, with respect to the distances exemplarily enumerated above in the three categories, it is to be noted that the distance between street lamps heavily depends on the lamps height, the type of street lamp, and the performance characteristics of the particular lamps implemented. However, for a typical street lamp system these characteristics are rather homogeneous throughout all lamps in the system and are further known at the design/installation time of the system. Thus, although the distances may vary between two different street light systems 200, still the three categories of distance will be present in both street light systems and the typical distance of each category will be known at design time. Consequently, the general distinct categories of distances of street lamps can be identified for any street lamp system in a real world scenario and reference measurements and/or installation guidelines can also be used to identify these categories and their respective distance thresholds. The number of categories, in almost all cases a number of three categories, may even vary such that there may be fewer categories or more categories. Therefore, the number of categories being defined as three just serves as an illustrative example for a preferred embodiment of the present disclosure.

Figure 9:
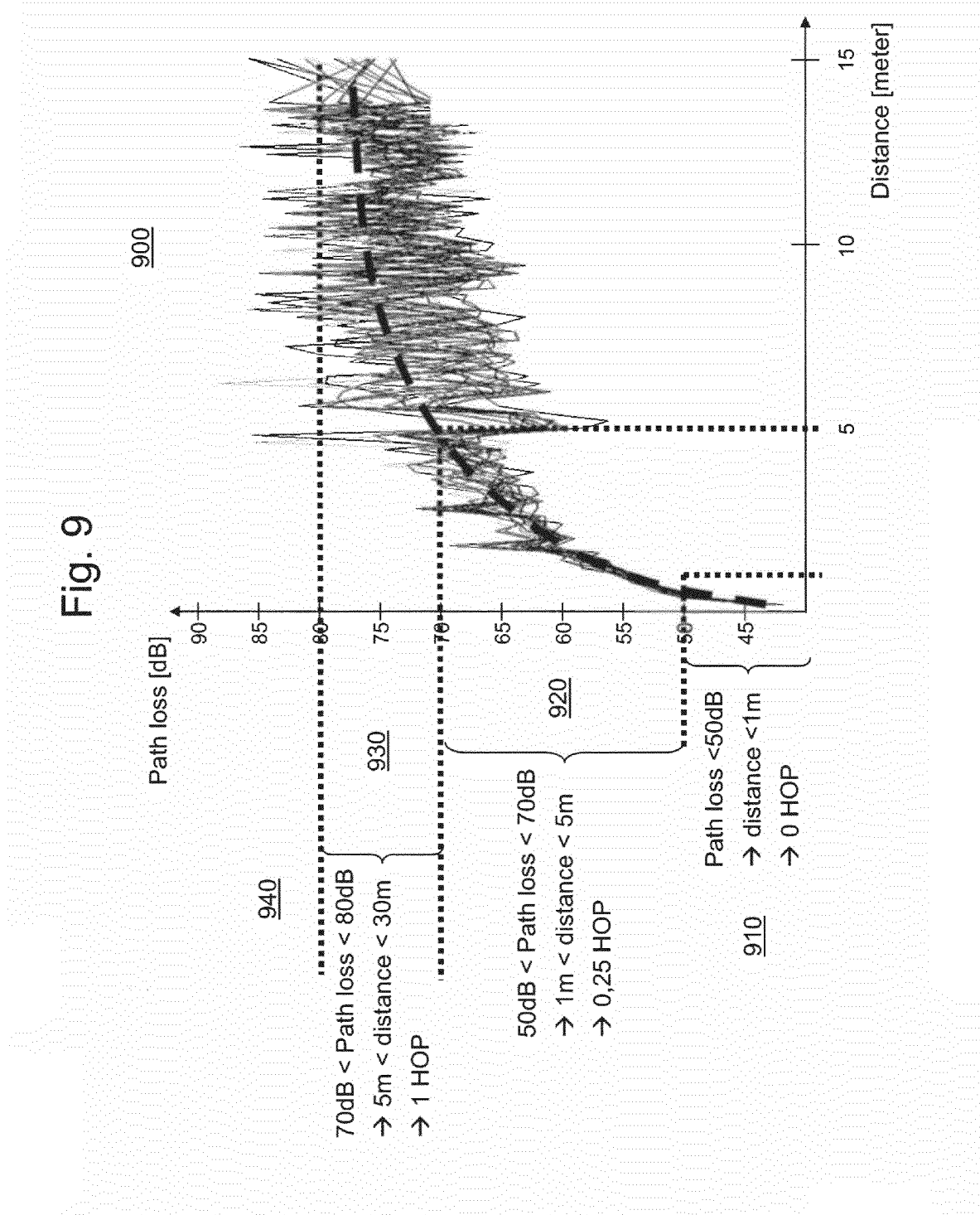
FIG. 9 illustrates link quantization and the respective distance categories of street lamps and their path loss based on sample data in accordance with embodiments of the present disclosure, FIG. 10 schematically shows a real life scenario for a street light system with anchor and blind street lamps in accordance with embodiments of the present disclosure.

Using the link quantization procedure the categories of distances of lamp posts in street light system 200 can be expressed in terms of hops in the mesh network 430. This link quantization, i.e., assigning one of the three typical distances present in street light system 200 to hop length of the mesh network 430 and furthermore to a typical range of path loss according the wireless network components used in a preferred embodiment to implement mesh network 430 is illustrated in FIG. 9. The measurement data depicted in diagram 900 comports to the data depicted in FIG. 7. Thus, also the path loss data depicted in diagram 900 conforms to the wireless network components 414/444 used in the preferred embodiments to implement street lamp node controllers 416/446.

Further, FIG. 9 illustrates the link quantization categories: the first category is shown with quantization 910. Here, any RSSI signal measurements resulting in a path loss lower than 50 dB is assigned to a distance of less or equal to 1 meter therefore assigned to the first category of distances meaning that the measure/estimated distance is the distance between two lamps of one unique lamp post. Here, the distance is expressed as 0 hops as in fact two lamps are detected being installed on the same unique lamp post which according to the network distance have no hop distance.

Further, the second quantization 920 assigns an RSSI measurement resulting in a path loss higher than 50 dB but lower than 70 dB to a distance of between 1 to 5 meters. Thus, this RSSI measurement would be assigned to the second categories of distances meaning describing the distance between lamp posts placed opposite to each other on both sides of a street at one point of the street. Accordingly, this distance of 1 to 5 meters is assigned to a network distance of 0.25 hops.

The third quantization 930 assigns an RSSI measurement with a path loss of 70 dB to 80 dB to a distance of between 5 to 30 meters. Hence, this third quantization 930 assigns substantially the unreliable part of the RSSI measurement continuum to the third category of distances present in street light system 200, i.e., the regular distance between neighbor lamp posts on the same side of the street of 20 to 30 meters. Any measurement matching quantization 940, meaning any RSSI measurement with a path loss of greater than 80 dB means a distance larger than 30 meters and this can be discarded as already quantization 930 relates the distance of the third category to one hop. Preferably, the path loss value used for this quantization procedure results from the TX power at the transmission side reduced by RSSI measured at the receiver side.

Based on the link quantization illustrated in FIG. 9, the street light monitoring system according to embodiments of the present disclosure provides the specific benefit of providing a high level of accuracy in multi-hop distance estimation using schemes depicted in FIG. 8 and at the same time reduces the number of anchor street lamps necessary to be present in the overall street light monitoring system in order to be able to reliably estimate the position of any blind street lamp. The latter fact results in the specific advantage of providing low installation costs as only the anchor street lamps need advanced equipment for example, in terms of GPS coordinates detecting equipment.

Figure 10:
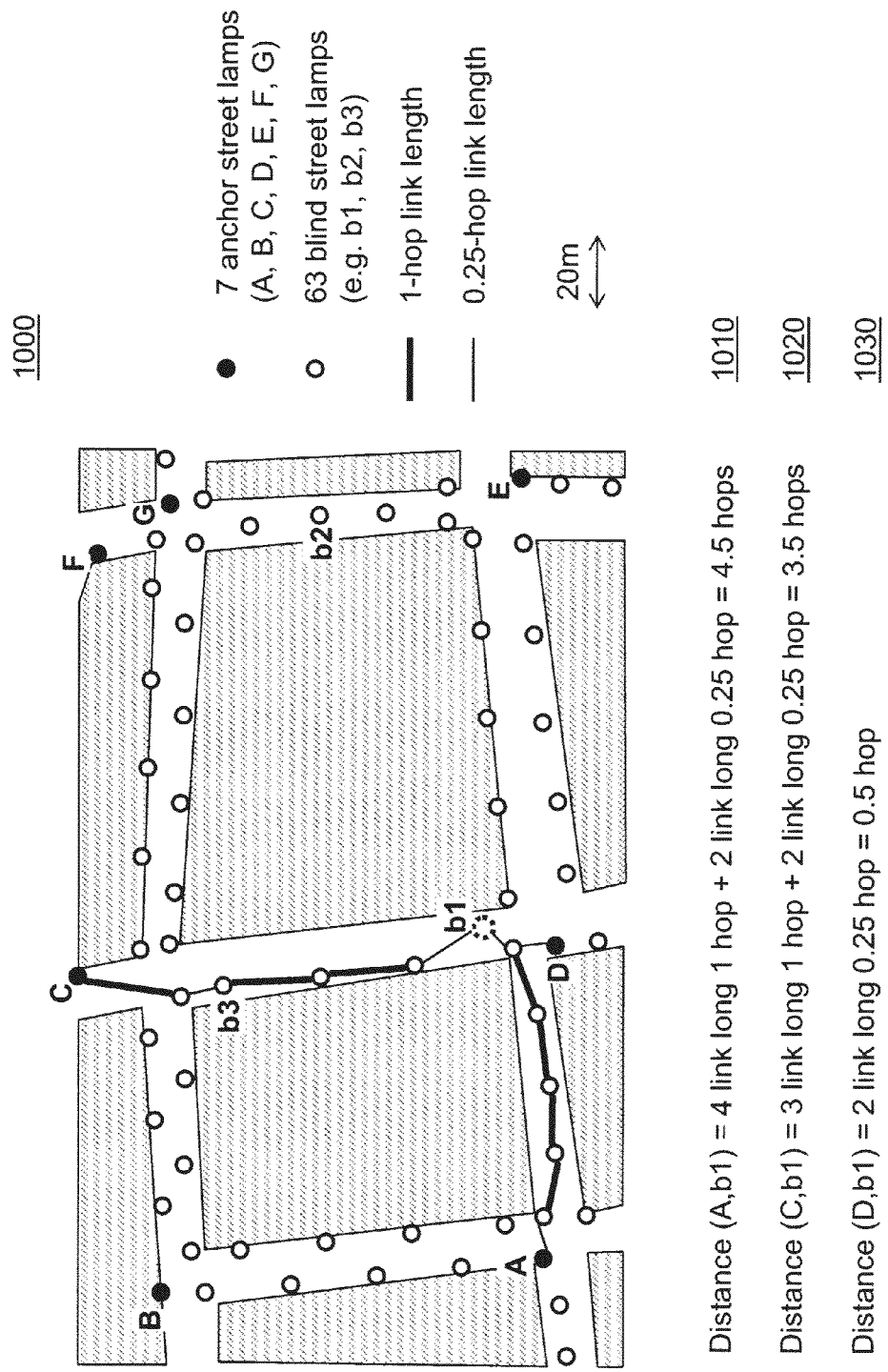

An exemplary real life system implementation highlighting these advantages is shown in FIG. 10, which shows the streets of a street map with the installed base of street lamps thereon. In particular, the configuration of street lamps 1000 depicted in FIG. 10 contains 70 street lamps. In configuration 1000, 7 of these 70 street lamps are configured as anchor street lamps that have been configured to hold their actual fixed position by, for example, exploiting GPS devices (namely anchor street lamps A to G). The other 63 street lamps of street lamp system 1000 are blind street lamps that are just equipped with node controllers 414/444, thus forming together with the 7 anchor street lamps a mesh network 430. Therefore, in the real world example 1000 an area of 150 to 250 meters is equipped with a total number of 70 lamps wherein only 7 of these 70 lamps are anchors and the rest are blind nodes.

FIG. 10 illustrates the distance estimation for blind node street lamp b1 based on distance estimation from anchor node street lamps A, C, and D. For computing that distance estimation, preferably a hybrid multi-hop approach is used combining range based and free range distance estimation. In particular, starting at b1 the number of hops is counted until an anchor node is reached. For reaching anchor node D, for example, starting from blind node b1 two links of 0.25 hop link length have to be traversed. For reaching anchor node A when starting from b1, four links of 1 hop length and two links of 0.25 hop length have to traversed. Accordingly, for calculating the coordinate's estimation of blind node b1 using the lateration 520 and computations 540/530 each distance from any anchor node A, C and D to the blind node b1 is expressed in number of hops of either 1 hop or 0.25 hop length. Accordingly, the distance from blind node b1 to anchor node A sums up to 4.5 hops, the distance from blind node b1 to anchor node C sums up to 3.5 hops and the distance of anchor node D to blind node b1 sums up to 0.5 hop length. Based on the three distances 1010 to 1030, again lateration 520 can be computed resulting in a position estimation for b1 as long as the absolute and relative coordinates of anchor nodes A, C and D are known.

Figure 11:
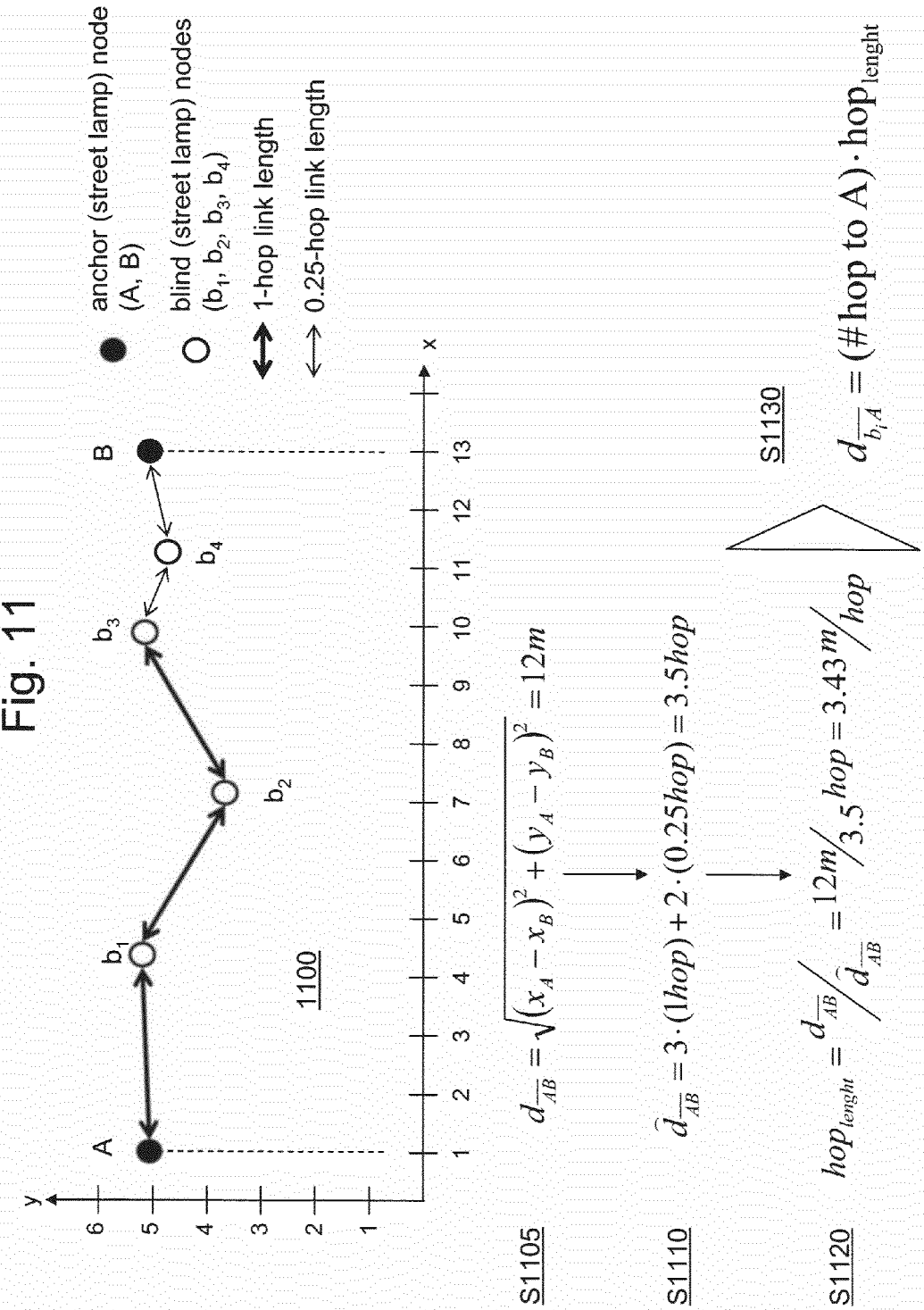
FIG. 11 illustrates path dependent distance estimation using multi-hop ranging in accordance with embodiments of the present disclosure, FIG. 12 schematically shows the emerging of errors in blind street lamp positioning estimation resulting from imprecise distance estimation to the anchor street lamps, FIG. 13 schematically shows positioning adjustment based on coarse position assignment to a closest real position of blind street lamps.

An example of distance estimation's computation is further illustrated in FIG. 11. FIG. 11 shows a configuration of six street lamps. In particular, in a path between anchor street lamp A and anchor street lamp B there are four blind street lamps b1 to b4. Distances are also illustrated here as 1 hop link length or 0.25 hop link length distances between street lamps. Based on configuration 1100 shown in FIG. 11, the distance from any blind node to an anchor node can be calculated using the number of hops and an average hop length. In a first step S1105, the known distance between the two anchor street nodes A and B is calculated by Euclidean distance, exploiting the known coordinates of A and B. Again, here it is to be noted that preferably 5 to 10% of the street lamps in the street lamp monitoring system are configured as anchor street lamp nodes holding their absolute and relative coordinates in a preferred embodiment based on exploiting GPS modules. Thus, the absolute and relative coordinates of anchor street lamp nodes A and B in configuration 1100 are known and the computation S1105 thus can be performed.

In the next step S1110, the distance between anchor street lamp nodes A and B is estimated using the multi-hop approach that has been discussed within the context of FIG. 8. Applying that scheme to configuration 1100 results in the distance of anchor street lamp nodes A to anchor street lamp nodes b summing up to 3 links of one hop length and two links of 0.25 hop lengths and an overall sum of 3.5 hops. Thus, the average hop length in the path of network 430 between anchor node A and anchor node B can be computed based on the known distance between anchor nodes A and B (12 meters in configuration 1100) and the distance estimation of the distance between anchor node A and anchor node B expressed in hop length (3.5 hops in the example of configuration 1100).

Thus, after computation of step S1105 and step S1110, in step 1120 the average hop length in the path between anchor nodes A and B can be calculated as the ratio of the real distance divided by the number of hops according to the distance estimation (resulting in an average hop length of 3.43 meters in the example of configuration 1100).

Accordingly, a distance estimation for any blind node b1 to b4 in configuration 1100, that means any blind nodes in the path between anchor node A and anchor node B can be computed using a multi hop distance estimation according to computation S1130 which uses the number of hops from the particular blind node b1 to b4 to an anchor node, for example anchor node A, and multiplying that number of hops with the average hop length calculated in S1120.

Nevertheless, the distance estimation according to computation S1130 heavily depends on the calculation of the "real" distance computed in S1105. That means that if the positioning information of the anchor street lamps A and B is not precise enough, also the distance estimation for the blind nodes will be rather inaccurate. Similarly, if blind nodes are placed in not regular and expected pattern, the estimated distances can be very different from real distances.

Figure 12:
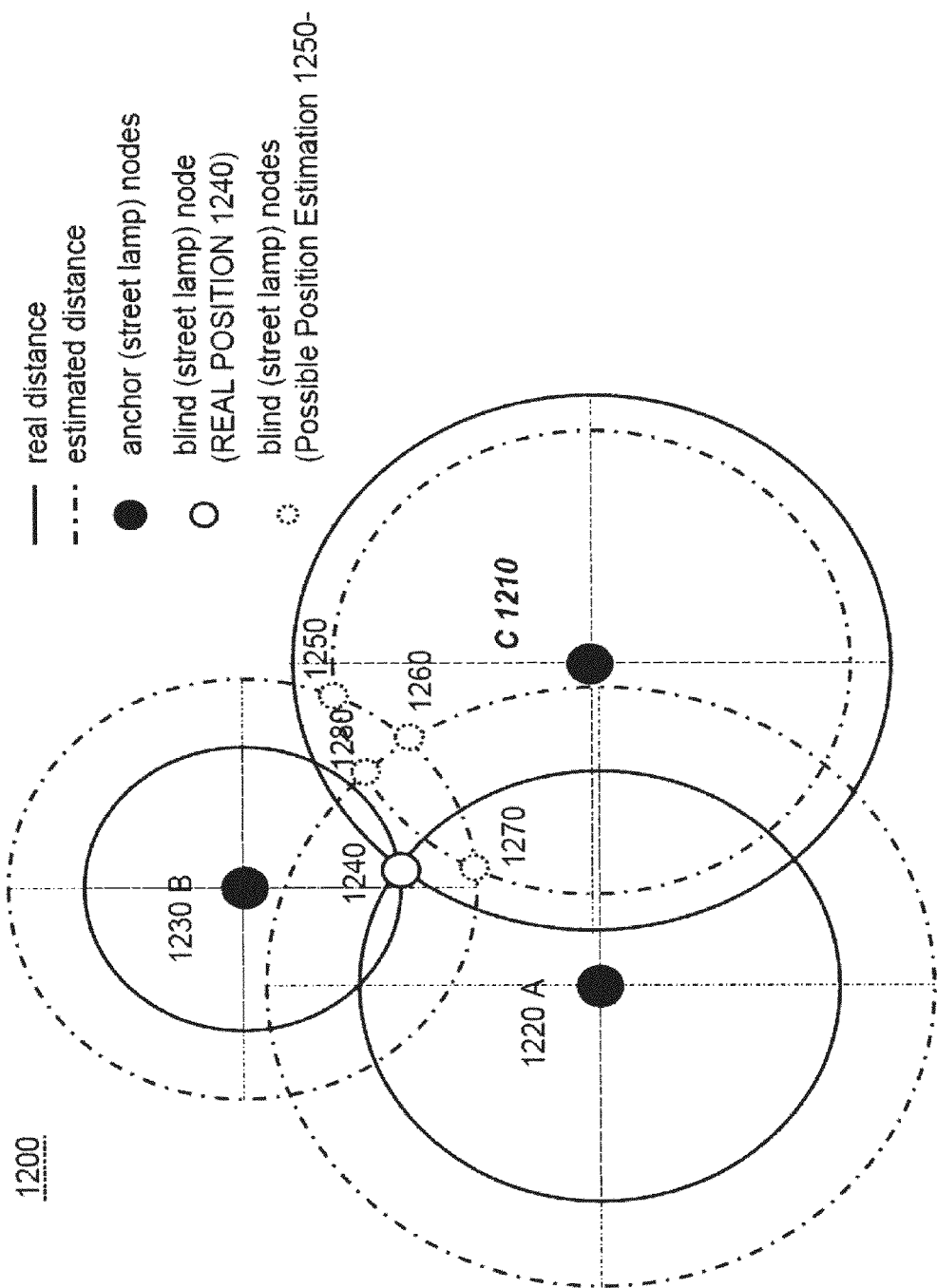

Moreover, errors in the distance estimations can result in high error in the position estimations. This is highlighted in FIG. 12 where configuration 1200 shows an example of three anchors street lamps 1210 to 1230 and a blind street lamp 1240. Estimating the possible position of blind street lamp 1240 is based on distance estimations depicted as dotted lines, while the real position can be calculated only based on real distances, depicted as continuous line. However, as can be seen, while exploiting the real distances to the anchors results to a unique solution (1240), adopting the distance estimation results in different possible estimated positions 1250 to 1280 of blind street lamp 1240. The distance between the estimated and the real position is as high as the errors of estimation of the distances to the anchors. Thus, in the real world example 1000 of FIG. 10 an area of 150 to 250 meters is equipped with a total number of 70 lamps wherein only 7 of these 70 lamps are anchors. This results in total hops lengths that can be more than 20 meter and even up to 30-35 meters as outlined above depending on the street light system and the propagation environment. Determining in such an environment the total hops length, exploiting the known distance in meters, and estimating distance in hops between the anchors presumes that the distances are almost precise as the inferred position based on "estimated" distances can be very different from the real position as shown in FIG. 12.

Figure 13:
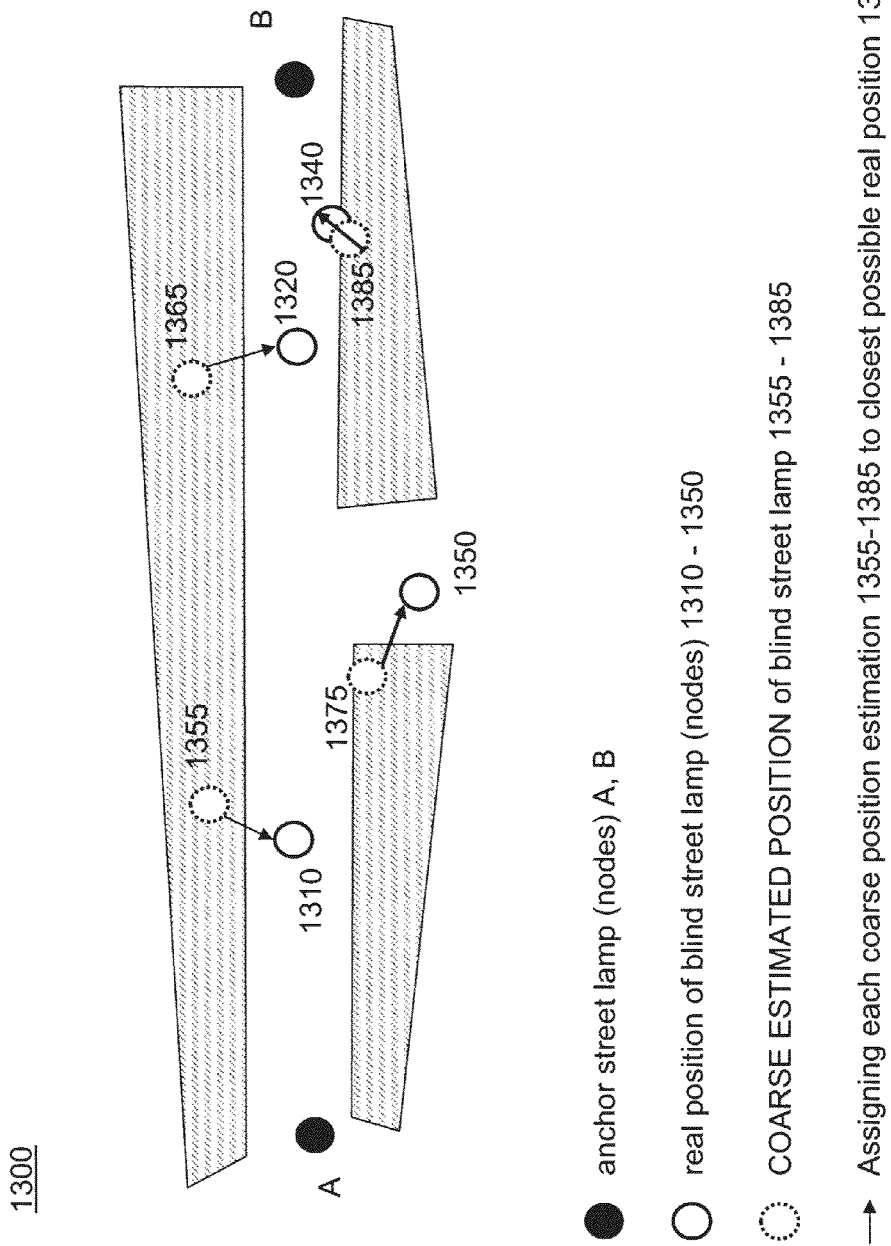

Therefore, a street light monitoring system according to an embodiment of the present disclosure takes advantage of a further mechanism to increase distance estimation accurateness, the position adjustment. This mechanism takes advantage of the fact that in the design phase of a street light system, the possible positions of street lamps are known with a relative and absolute coordinate. Therefore, as depicted in FIG. 13, after a coarse position estimation using the mechanisms of link quantization as depicted in FIG. 9 and multi-hop distance estimation as depicted in FIG. 11, an accurate co-location of street lamps 1310 to 1350 can be achieved by automatically assigning the closest possible position 1310 to 1350 to each estimated position 1355 to 1385 by lateration. Preferably, for the case that a street lamp does not have a close possible real position, this street lamp classifies itself automatically as "not positioned" and retries its coordination estimation. In a preferred embodiment, a street lamp does not have a close possible real position if the distance to the nearest anchor is higher than a distance threshold. In a preferred embodiment, alternatively an error message is sent in order to initiate a managed new position setting. Thus, using the automated computer implemented position adjustment scheme, multi-hop distance estimation can be complemented with an automated assigning scheme that assigns the estimated coarse position of blind street lamps to real positions of blind street lamps.

Thus, with the street light monitoring system according to embodiments of the present disclosure, automated position estimation capabilities are added to an efficient management of street lamps based on using a wireless low power communication technology. According to embodiments of the present disclosure, in a typical street light monitoring system only a small fraction of the street lamps preferably 5 to 10% have to be configured to hold their actual fixed position, for example, by exploiting GPS devices. These anchor street lamp nodes according to embodiments of the present disclosure represent the reference points for nodes in the mesh network formed by the street lamps of the system. The other preferably 90 to 95% of the street lamps can automatically derive their position exploiting the anchors coordinates and estimate the distances to them. This deriving of the blind nodes position is enhanced using schemes of link quantization, multi-hop distance estimation and street lamp position adjustment.

Thus, the distance estimation for any blind node is performed by using the received signal strength measured with an incoming message at the respective blind node. As this metric (RSSI) is reliable only for small distances of up to a threshold value, in a preferred embodiment 5 meters, the link quantization technique takes advantage of the lamp post's typical placement. The inferred distances between the lamp posts can be assigned to pre-determined categories of distances, in a preferred embodiment three categories, the first equaling a distance of roughly 1 meter (two lamps on the same lamp post), the second equaling a distance of 4 to 5 meters (two lamps on either side of a street), and the third equaling a distance of 20 to 30 meters (typical distance of two street lamps on the same side of a street).

This distance estimation using the outlined quantization approach may result in a coarse estimation and the further technique of position adjustment is provided that allows for improving the interference of the blind lamp node. This technique takes advantage of the fact that during the design phase of the street lamp system, most possible positions for lamp posts are well known in terms of their relative and absolute coordinates based on considering, for example, street length, parks, the previous lighting system and so on. Thus, using the automated street lamp position adjustment scheme, the estimated street lamp position can be updated to the closest possible position of the relative coarse estimation. Accordingly, an automated scheme is provided that adjusts the initial coarse street lamp estimated position to their closest respective possible "real" position defined during the design phase of street light system, and if there is no closer possible real position a blind street lamp node will preferably classify itself as not positioned and thus retries the estimation or sends an error message for a manual position set-up request.

Therefore, embodiments of the present disclosure use path loss measurement derived from RSSI as an indicator of distance between radio frequency devices, preferably RF-ZigBee devices, but implements the specific insight, that this indication is only reliable for short distances up to a threshold value, using a preferred embodiment and assuming a typical environment the threshold value will be around 5 to 10 meters, depending on the environmental configuration and the specific RF-devices used. Hence, the poor reliability of the RSSI raw signal is overcome by implementing a quantization technique which allows assigning a position based not only on the raw RSSI value but on the number of hops between the node itself and the anchors where the average hop length is computed based on the translation of RSSI into path loss and from path loss to hop lengths. Thereby, the general architecture to control street lights is enriched with location awareness capability without modifying its structure because the devices which participate in the location awareness are the street lights and their street light controller themselves. Further, low cost implementation can be achieved as only a fraction of the street light controllers (preferably 5 to 10%) is configured as anchor nodes, i.e., provided with the absolute and relative coordinates. The location estimation of the other blind lamps is computed by the described algorithm. The cluster controllers and cluster head devices preferably do not participate in the location detection algorithm.

As compared to the state of the art, this specific system set up provides a number of advantages. In particular, one alternative scheme would be the measurement of time of arrival for distance estimation. Here, the time of flight of a packet can be used to estimate the distance from the source to the destination. However, for that computation high accuracy timers are needed that are able to reliably measure nanoseconds for estimated distances in terms of meters. Further, this measurement is rather inaccurate for a quick signal travelling at almost the speed of light and the small distances of 5 to 30 meters present in the system. Alternatively, also all (instead of only 5 to 10% each) of the street lights could be equipped with GPS modules. However, that obviously would result in substantially higher costs. Maps and data labeling at set up time would also present an alternative solution. On the other hand, these static schemes show a poor scalability and a limited manageability as the data (label lamp, geo location) is managed offline and not dynamically within the management system.

Thus, embodiments of the present disclosure provide a combination of techniques, in particular the inferring of position of street lamps, the quantization of links and the finger printing of street light positions such that a simple and low cost solution is provided that allows for remotely and individually managed street lights in a large scale street light system. With the quantization thresholds exemplarily discussed in context with FIG. 9, control knobs are provided which allow for adjusting the system to any specific environment like, for example, in a city, industrial zones, public parks, stadium and the like. Therefore, the system can be adjusted to be set according to the environment the street lights are implemented in, the technology applied, the form of lamp used and applied, and the light technology of the street light system.

Figure 14:
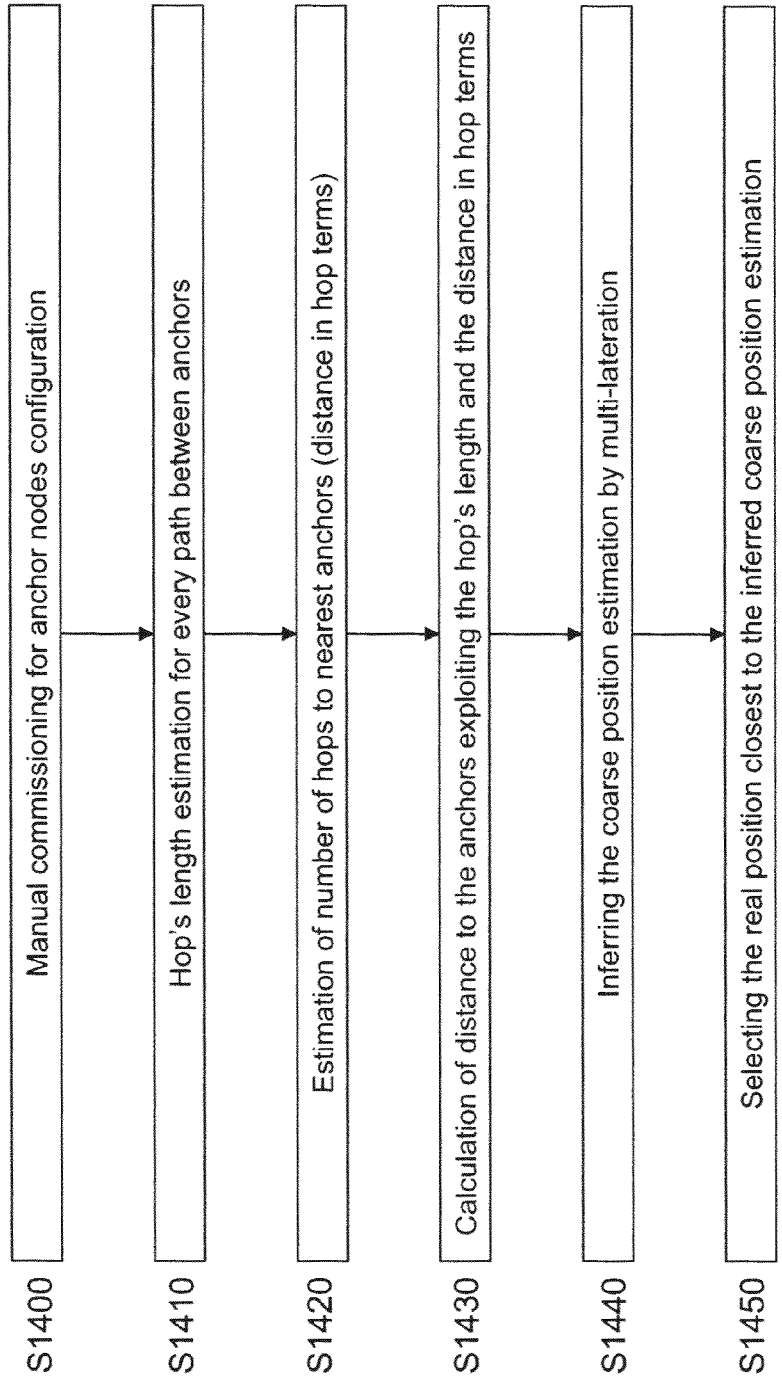
FIG. 14 depicts a flow chart for illustrating the steps of the operation of a street light monitoring system in accordance with embodiments of the present disclosure.

With reference to FIG. 14, the steps of a preferred embodiment of the present disclosure are depicted in the form of a flow chart. In step S1400, a manual commissioning for anchor node configuration is performed. Further, in step S1410 an average hop length estimation for each path between the assigned anchors is computed according to the schemes discussed within the context of FIG. 11. Next, in step S1420 for each blind node, the number of hops to the nearest anchor nodes is estimated. Thus, in the next step S1430, the distance to those anchors is calculated exploiting the previously computed average hop's length and the previously estimated distance in hop terms. In the next step S1440, the coarse position estimation of each blind node position is inferred using multi lateration 520. Lastly, in step S1450, by selecting the real position closest to the inferred coarse position estimation, a street lamp position adjustment is performed resulting in the final and precise co-location of all blind street lamps.

The invention claimed is:

1. A computer-implemented method for a street light monitoring system providing automated position estimation capabilities for all street lights being present in the street light system and thereby enabling efficient management of street lamps, the method comprising:
    providing each street lamp of a network of numerous street lamps with a node controller and a ballast controller, the node controllers of the street lamps communicating to each other using wireless devices to build up a mesh network;
    providing a number of cluster controllers, the cluster controllers controlling a subset of the street lamps in the network and being equipped with a transceiver, the transceiver communicating to the mesh network;
    providing a cluster head, the cluster head controlling the network of street light and being coupled to the number of cluster controllers based on an external network;
    providing a small fraction of the street lamps in the network and less than 30% of the street lamps in the network as anchor street lamps with their absolute and relative coordinates;
    determining the average hop length in any minimum length path between two anchor street lamps;
    determining for each street lamp in the network not being provided with their absolute and relative coordinates as blind street lamps the distance of the blind street lamp to the nearest anchor street lamps based on path loss evaluating received signal strength indication, RSSI, between the street lamps in the path to the nearest anchor street lamps, assigning the measured path loss values to predetermined distance categories, assigning the distance categories to hop link values and multiplying the hop link values with the average hop length in the respective path;
    inferring for each blind street lamp in the network a coarse position using multi-lateration based on the determined distances to the nearest anchor street lamps for that blind street lamp; and
    adjusting the coarse position by selecting for each blind street lamp coarse position the closest possible real position and if no closest possible real position is present classify the blind street lamp as not positioned.

2. The method according to claim 1, further comprising for the case that no closest possible real position is present;
    retrying the estimation; and
    sending an error message for a manual position set-up request.

3. The method according to claim 2, wherein the number of distance categories is three, the first relating to two lamps being positioned on the same lamp post, the second being related to two lamps being positioned opposite to each other on either sides of a street, and the third being related to two lamps being positioned as neighbors on the same side of a street.

4. The method according to claim 3, wherein the first distance category is assigned to a hop link value of 0 hop links, the second distance category is assigned to a hop link value of 0.25 hop links, and the third distance category is assigned to a hop link value of 1 hop links.

5. The method according to claim 4, wherein the node controller is a RF-ZigBee device, the mesh network is a WPAN according to the ZigBee standard, and the transceiver is a radio frequency ZigBee transceiver linked to a wired or wireless modem.

6. The method according to claim 5, wherein the small fraction of street lamps is a number of 5-10% of all street light being present in the system.

7. A non-transistory computer-readable storage medium having stored thereon computer-readable instructions that, when run on a computer, are configured for performing the steps of:
    providing each street lamp of a network of numerous street lamps with a node controller and a ballast controller, the node controllers of the street lamps communicating to each other using wireless devices to build up a mesh network;
    providing a number of cluster controllers, the cluster controllers controlling a subset of the street lamps in the network and being equipped with a transceiver, the transceiver communicating to the mesh network;
    providing a cluster head, the cluster head controlling the network of street light and being coupled to the number of cluster controllers based on an external network;

providing a small fraction of the street lamps in the network and less than 30% of the street lamps in the network as anchor street lamps with their absolute and relative coordinates;

determining the average hop length in any minimum length path between two anchor street lamps;

determining for each street lamp in the network not being provided with their absolute and relative coordinates as blind street lamps the distance of the blind street lamp to the nearest anchor street lamps based on path loss evaluating received signal strength indication, RSSI, between the street lamps in the path to the nearest anchor street lamps, assigning the measured path loss values to pre-determined distance categories, assigning the distance categories to hop link values and multiplying the hop link values with the average hop length in the respective path;

inferring for each blind street lamp in the network a coarse position using multi-lateration based on the determined distances to the nearest anchor street lamps for that blind street lamp; and adjusting the coarse position by selecting for each blind street lamp coarse position the closest possible real position and if no closest possible real position is present classify the blind street lamp as not positioned.

8. A system, comprising:

a network of street lamps, each street lamp equipped with a node controller and a ballast controller, the node controllers of the street lamps communicating to each other using wireless devices to build up a mesh network;

a plurality of cluster controllers, each of the plurality of cluster controllers controlling a subset of the street lamps in the network and being equipped with a transceiver, the transceiver communicating to the mesh network;

a cluster head, the cluster head controlling the network of street lamps and being coupled to the plurality of cluster controllers based on an external network;

a plurality of anchor street lamps, the plurality of anchor street lamps being less than 30% the street lamps in the network and being provided with respective absolute and relative coordinates;

means for determining the average hop length in any minimum length path between two anchor street lamps;

a plurality of blind street lamps, each of the plurality of blind street lamps not being provided with absolute and relative coordinates;

means for determining the distances of each blind street lamp to the nearest anchor street lamps based on path loss evaluation using received signal strength indication between street lamps in a path to the nearest anchor street lamps, assigning measured path loss values to pre-determined distance categories, assigning the distance categories to hop link values, and multiplying the hop link values with the average hop length in the respective path;

means for inferring for each blind street lamp in the network a coarse position using multi-lateration based on the determined distances to the nearest anchor street lamps for that blind street lamp; and means for adjusting the coarse position by selecting for each blind street lamp coarse position the closest possible real position and if no closest possible real position is present then classifying the blind street lamp as not positioned.

9. The system according to claim 8, further comprising for the case that no closest possible real position is present; retrying the estimation; and sending an error message for a manual position set-up request.

10. The system according to claim 9, wherein the number of distance categories is three, the first relating to two lamps being positioned on the same lamp post, the second being related to two lamps being positioned opposite to each other on either sides of a street, and the third being related to two lamps being positioned as neighbors on the same side of a street.

11. The system according to claim 10, wherein the first distance category is assigned to a hop link value of 0 hop links, the second distance category is assigned to a hop link value of 0.25 hop links, and the third distance category is assigned to a hop link value of 1 hop links.

12. The system according to claim 11, wherein the node controller is a RF-ZigBee device, the mesh network is a WPAN according to the ZigBee standard, and the transceiver is a radio frequency ZigBee transceiver linked to a wireless or wired modem.

13. The system according to claim 12, wherein the small fraction of street lamps is a number of 5-10% of all street light being present in the system.

14. The system according to claim 11, wherein the node controller is a RF-ZigBee device, the mesh network is a WPAN according to the ZigBee standard, and the transceiver is a radio frequency ZigBee transceiver linked to a wireless or wired modem.

15. A method, comprising:

for a small fraction of street lights in a street light system, providing absolute and relative coordinates for the street lights, each such street light being referred to as an anchor street light;

determining an average hop length in any minimum length path between two anchor street lights;

determining for each street light not provided with absolute and relative coordinates, where each such street light is referred to as a blind street light, the distance of the blind street light to the nearest anchor street light being based on a received signal strength indication between street lights in a path to the nearest anchor street light;

assigning measured path loss values to pre-determined distance categories;

assigning distance categories to hop link values and multiplying the hop link values by the average hop length in the respective path;

inferring for each blind street light a coarse position using multi-lateration based on the determined distances to the nearest anchor street lamps for that blind street lamp; and adjusting the coarse position of each blind street light by selecting a nearest possible real position.

16. The method of claim 15 wherein if no closest possible real position is present, classifying the blind street lamp as being not positioned.

17. The method of claim 15 wherein there are three distance categories, the first relating to two street lights being positioned on the same lamp post, the second being related to two street lights being positioned opposite to each other on either sides of a street, and the third being related to two street lights being positioned as neighbors on the same side of a street.

18. The method of claim 17 wherein the first distance category is assigned a hop link value of 0 hop links, the second distance category is assigned a hop link value of 0.25 hop links, and the third distance category is assigned a hop link value of 1 hop links.

19. The method of claims 15 wherein the small fraction of street lamps is between 5-10% of all street lights in the system.

20. A street light monitoring system, comprising:
    a network of street lamps, each street lamp including a node controller and the node controllers of the street lamps communicating with each to form a mesh network;
    a plurality of cluster controllers, each cluster controller communicating through the mesh network to control a subset of the street lamps in the network;
    a cluster head operable to control the network of street lamps and being coupled to the cluster controllers through an external network;
    a plurality of anchor street lamps wherein the plurality is a small fraction of the total number of street lamps in the network;
    a plurality of blind street lamps corresponding to the remaining street lamps in the network;
    control circuitry operable to determine the position of the blind street lamps through link quantization, multi-hop distance estimation, and street lamp position adjustment.

21. The street light monitoring system of claim 20 wherein the control circuitry is further operable to,
    determine the average hop length in any minimum length path between two anchor street lamps;
    determine the distance of a respective blind street lamp to the nearest anchor street lamps based on a path loss metric between the street lamps in the path to the nearest anchor street lamps,
    assign determined path loss values to pre-determined distance categories,
    assigning hop link values to the pre-determined distance categories,
    multiply the hop link values with the average hop length in the respective path,
    determine for each blind street lamp in the network a coarse position using multi-lateration based on the determined distances to the nearest anchor street lamps for that blind street lamp,
    adjust the coarse position by selecting for each blind street lamp coarse position the closest possible real position, and if no closest possible real position is present classify the blind street lamp as being not positioned.

* * * * *